UNITED STATES PATENT OFFICE.

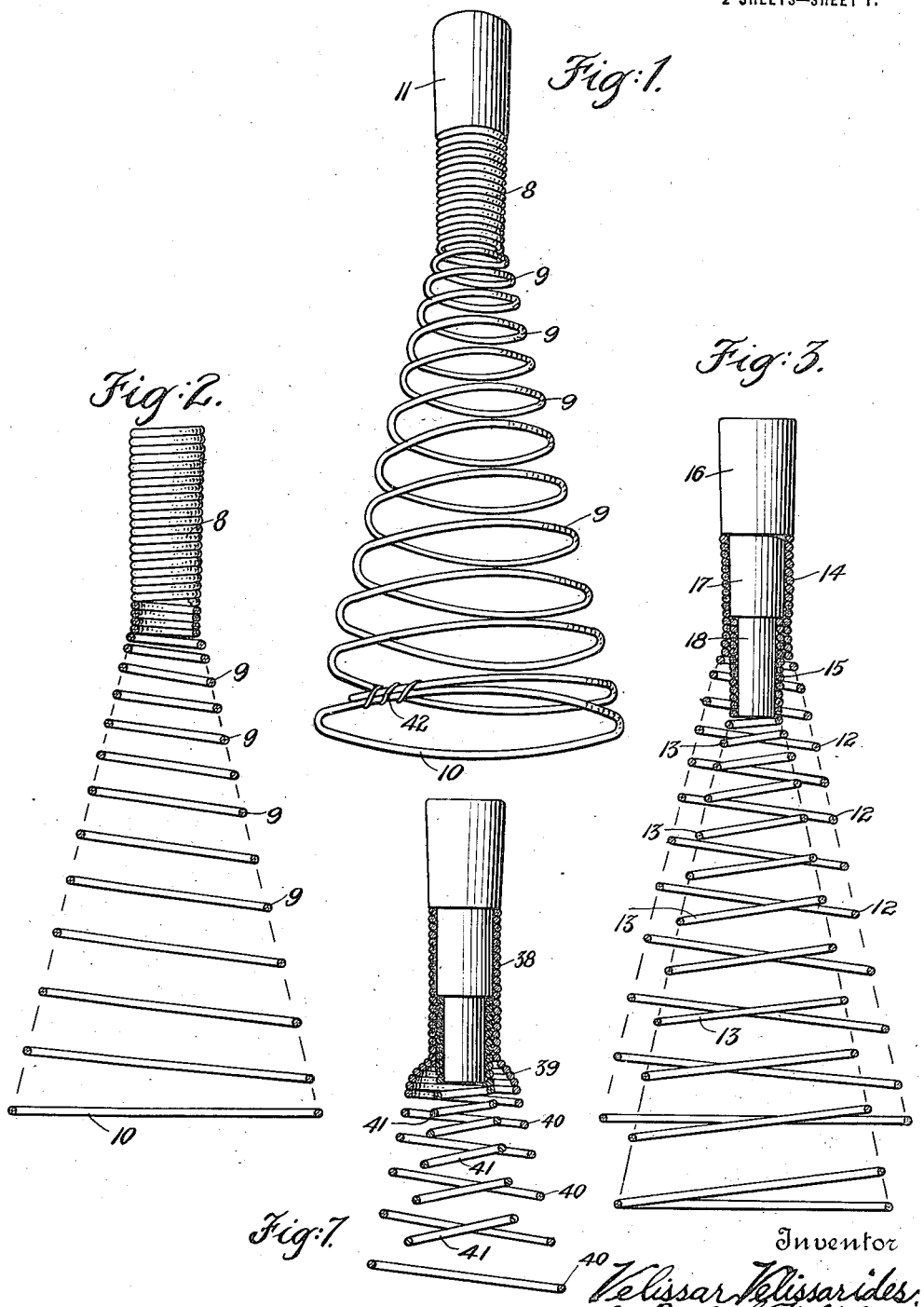

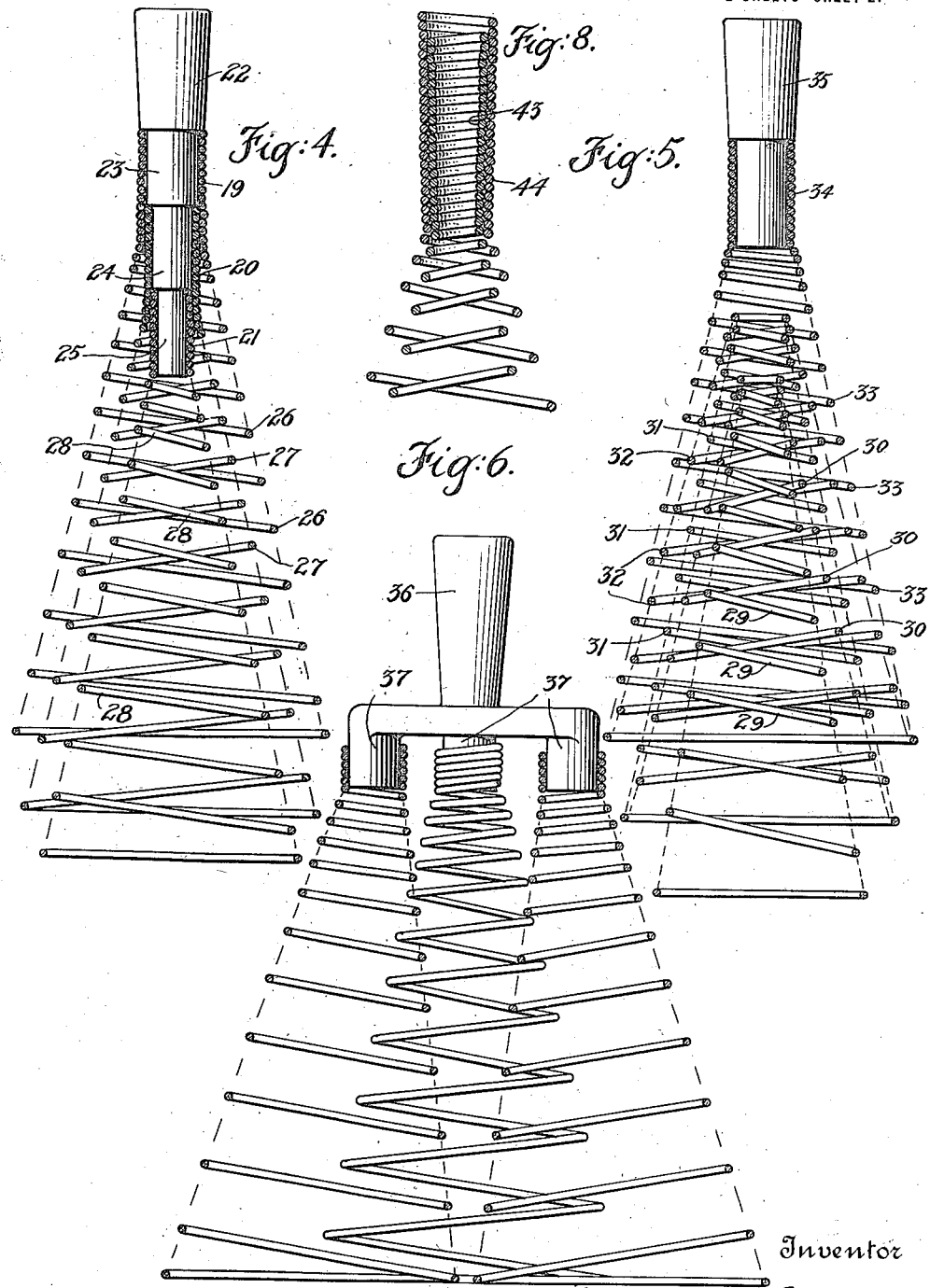

VÉLISSAR VÉLISSARIDÈS, OF NEW YORK, N. Y.

EGG-BEATING IMPLEMENT.

1,208,862.

Specification of Letters Patent.   Patented Dec. 19, 1916.

Application filed August 21, 1916.   Serial No. 115,930.

*To all whom it may concern:*

Be it known that I, VÉLISSAR VÉLISSARIDÈS, a subject of the Sultan of Turkey, and a resident of New York, in the county of New York and State of New York, have invented certain new and useful Improvements in Egg-Beating Implements, of which the following is a specification.

My invention relates to egg beating, mixing, and similar culinary devices; and the object thereof is to provide an improved implement of the class in question which may be readily made from a piece of wire bent and coiled into proper form as hereinafter explained, which implement will be simple in construction and more effective for the purpose of beating eggs, whipping cream, mixing various ingredients in cooking and food preparation operations, and for performing other similar operations, than has been the case heretofore in implements provided for similar purposes.

A further object of my invention is to provide an implement of the kind referred to which will be simple in construction and of such form that it may be readily and cheaply manufactured, and one which may be kept clean and sanitary by the owner and user with a minimum of effort and attention.

With the above and other objects of invention in view, my invention consists in the improved egg beating implement illustrated in the accompanying drawings and hereinafter described and claimed, and in such variations and modifications thereof as will be obvious to those skilled in the art to which my invention relates.

In the drawings wherein the preferred embodiment of my invention is illustrated, Figure 1 is a view showing one form of my invention in side elevation; Fig. 2 is a view showing a modified form thereof partly in section; Fig. 3 is a sectional view showing a form of my invention in which an implement of greater capacity and effectiveness is provided; Fig. 4 is a view similar to Fig. 3 and illustrating a form of my invention in which still greater capacity and effectiveness are secured; Fig. 5 is a sectional view showing a further modified form of my invention; Fig. 6 is a view showing an arrangement whereby an implement of greater capacity than the forms illustrated in Figs. 3 and 4 is secured, and Figs. 7 and 8 are fragmentary views showing forms of my invention similar to the form shown in Fig. 3, but modified as to certain of the features of construction thereof.

Referring first to Figs. 1 and 2 of the drawings, my improved egg beating implement there illustrated is formed from a single piece of hard, flexible and elastic wire such, for example, as springs are commonly made from; the said wire being coiled to provide an upper substantially cylindrical handle portion 8 made up of a plurality of turns or whirls, and throughout which portion the separate turns or whirls lie close together and are in, or substantially in contact with one another, and a lower operating portion likewise made up of a plurality of turns or whirls, which portion is substantially conical in form and throughout which the separate turns or whirls 9 increase in diameter or size from the upper to the lower end thereof, and are spaced apart from one another; whereby an open coil or spring is provided the turns of which approach one another when the lower end 10 of the implement contacts with the bottom of the receptacle containing the material operated upon, and the upper end 8 or portion thereof grasped by the operator is forced downward, the conical portion being referred to as an operating portion because it is the part which acts upon the material when the implement is in use, as will be understood.

The upper closely coiled handle portion 8 of the implement may be of sufficient length to be grasped by the user, as shown in Fig. 2, or a separate handle 11 of wood or other suitable material may be provided, as shown in Fig. 1, the lower end of which extends into the portion 8, in which last mentioned case the closely coiled cylindrical portion of the implement may be made shorter than shown in Fig. 2, if desired.

Fig. 3 illustrates a form of my invention in which two separate members each of the form illustrated in Figs. 1 or 2, but which members differ in size so that one may be located or arranged within the other, as shown, are employed, in order to thereby provide an implement of greater capacity and effectiveness, as more parts of the implement act upon the material being mixed, stirred, or otherwise operated upon when the device is in use than is the case in the forms illustrated in Figs. 1 and 2. In this form the separate pieces of wire from which the two members are formed are preferably coiled in opposite directions, so that the planes of the several separate turns or whirls 12, 13 of the lower conical portions are inclined with reference to one another, to the end that the whirls will be less likely to become entangled when the implement is in use; and the upper end of the cylindrical portion 15 of the inner member preferably enters the lower end of the cylindrical portion 14 of the outer member, so that the cylindrical portions overlap to a greater or less extent, and the lower end of the conical portion of the inner member preferably extends beyond the lower end of the conical portion of the outer member, as shown. This form of my invention may be equipped with a wooden handle 16 having reduced portions 17, 18 adapted to fit within the cylindrical portions 14, 15, as shown, or peripheral contact between the cylindrical portions may be relied upon to hold the two members together; in which latter case the cylindrical portions will be preferably of such lengths that their upper ends terminate in one and the same plane.

The idea embodied in the form of my invention illustrated in Fig. 3 is carried farther in the form shown in Fig. 4, wherein three separate members or devices similar to that shown in Fig. 1 or 2, but differing in size, are arranged one within the other, the cylindrical portions 19, 20 and 21 overlapping to a greater or less extent as above explained, and a handle 22 having portions 23, 24 and 25 which fit within the cylindrical portions being employed in order to strengthen and stiffen the handle portion of the implement. The lower open conical portions lie one within the other, and the planes or the several separate turns or whirls 26, 27, 28 thereof are preferably inclined relatively; this end being attained by coiling the wires of the inner and outer of the three component members in one and the same direction, and the wire from which the middle or intermediate member is formed in the opposite direction, as will be understood.

Fig. 5 illustrates a form of my invention in which a single piece of wire is coiled in such a way as to provide a plurality of conical portions arranged one within another, each portion being made up of a plurality of turns or whirls 29, 30, 31, 32 and 33 spaced apart from one another, as shown, and the upper end of which wire is formed into a closely coiled cylindrical portion 34 designed to serve as a handle, or to receive the reduced end of a separate handle 35; the planes of the whirls of each conical portion being inclined with reference to the planes of the whirls of the next inner or outer conical portion, the same as in the forms of my invention hereinbefore referred to and described.

Fig. 6 illustrates how a plurality of any one of the forms of my invention illustrated and hereinbefore described may be secured to a single operating handle in order to still further increase the capacity and efficiency of the device; three such forms as are shown in Fig. 1 being shown as connected independently of one another with a single operating handle 36, through arms 37 spaced apart from one another; although it will be appreciated that the handle could as well serve as a support for any number greater than one of any of the particular embodiments or forms of my invention hereinbefore referred to and shown in the drawing.

Fig. 7 illustrates a detail of construction which may be employed, if desired; and in which in effect a guard is provided at the lower end of the handle portion, and the uppermost whirls of the conical portion of the implement are larger in diameter than in the forms of my invention illustrated in the other figures. In this form the closely coiled cylindrical portion 38 of the outer of two such independent members as are employed in the form shown in Fig. 3, is enlarged at its lower end, as shown at 39, which closely wound portion merges with the open coil conical lower portion 40, as shown, the inner member 41 being of the same construction in this form of my invention as the form illustrated in Fig. 3.

In any of the forms of my invention the end of the wire at the lower end of the conical portion may be left free, or may be connected with the lowermost whirl of said conical portion, as shown at 42, Fig. 1.

In use the lower end of the conical portion of the implement, when of the forms shown in Figs. 1, 2 or 6, or the lower end of the longest of the conical portion thereof when of the forms shown in the other figures, rests upon the bottom of the receptacle containing the material to be operated upon. The upper end of the implement is then depressed, and returned by the spring action of the open coil conical portion, until the material is deemed to be sufficiently beaten, mixed, or stirred; during which operation it will be obvious that the material will be acted upon in a very thorough manner, and by a large number of mutually movable parts or portions of the implement, whereby an extremely effective beating, stirring or similar action is secured. In those forms of my invention comprising two separate members arranged one within the other, the fact that the planes of the separate turns or whirls of the conical portions of the two members are inclined relative to one another tends to prevent the whirls of one portion from becoming entangled with those of the other, as above explained; and, furthermore, such a construction tends to impel portions of the material operated upon in various different directions, because of the action of the relatively inclined whirls of the two conical portions, thus setting up or tending to establish cross currents within the material, all of which results in a very effective and thorough mixing or beating action. Finally, while I have shown the forms of my invention illustrated in Figs. 3, 4, and 7 as provided each with a separate wooden handle portion, it will be appreciated that the closely coiled cylindrical portions of the separate members may themselves form the handle of the implement, as shown in Fig. 8, wherein the cylindrical portion 43 of the inner member extends into the cylindrical portion 44 of the outer member, the two being held together by contact with one another and thus forming the handle of the device.

Having thus described and explained my invention, I claim and desire to secure by Letters Patent:—

1. An egg beater having a plurality of members arranged one within another; each of said members being formed from a single piece of wire coiled to provide a cylindrical handle portion comprising a plurality of turns or whirls in contact with one another, and a conical operating portion comprising a plurality of turns or whirls spaced apart from one another; and a handle extending into the interior of and having portions of different diameters adapted to fit within said cylindrical portions.

2. An egg beater made up of two members arranged one within the other and each of which members is formed from a single piece of wire coiled to provide a cylindrical portion comprising a plurality of turns or whirls in contact with one another, and a conical portion comprising a plurality of turns or whirls spaced apart from one another; the cylindrical portion of the inner of said members extending into the cylindrical portion of the outer member.

3. An egg beater made up of two members arranged one within the other and each of which members is formed from a single piece of wire coiled to provide a cylindrical portion comprising a plurality of turns or whirls in contact with one another, and a conical portion comprising a plurality of turns or whirls spaced apart from one another, and having a handle extending into the interior of said cylindrical portions; the planes of the turns or whirls of the outer conical member being inclined with reference to the planes of the turns or whirls of the inner conical member.

In testimony whereof I have signed my name to this specification this fourteenth day of August 1916.

VÉLISSAR VÉLISSARIDÈS.